United States Patent
Song

(10) Patent No.: US 7,042,620 B2
(45) Date of Patent: May 9, 2006

(54) LIGHT MODULATOR USING NEAR-FIELD

(75) Inventor: Jong-Hyeong Song, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 10/952,527

(22) Filed: Sep. 28, 2004

(65) Prior Publication Data

US 2005/0270623 A1 Dec. 8, 2005

(30) Foreign Application Priority Data

Jun. 3, 2004 (KR) ...................... 10-2004-0040388

(51) Int. Cl.
*G02B 26/00* (2006.01)

(52) U.S. Cl. ...................... 359/290; 359/291; 359/298; 359/558; 359/569

(58) Field of Classification Search ................ 359/290, 359/291, 298, 558, 569, 572
See application file for complete search history.

(56) References Cited

U.S. PATENT DOCUMENTS

| 5,311,360 A | 5/1994 | Bloom et al. |
| 6,411,423 B1 * | 6/2002 | Ham .......................... 359/290 |
| 6,519,073 B1 * | 2/2003 | Goossen ..................... 359/290 |

* cited by examiner

*Primary Examiner*—Ricky L. Mack
*Assistant Examiner*—Brandi Thomas
(74) *Attorney, Agent, or Firm*—Christensen O'Connor Johnson Kindness PLLC

(57) ABSTRACT

Disclosed is a spatial light modulator using a near-field. The spatial light modulator includes a light permeable substrate which has a predetermined first refractive index and allows incident light passing through a side thereof from an external light source to permeate therethrough. A near-field forming member has a second refractive index smaller than the first refractive index, and is formed on the other side of the light permeable substrate to achieve total reflection of the incident light to form the near-field. Actuating elements each have a third refractive index larger than the second refractive index, and are formed on the other side of the light permeable substrate to be moved close to or away from the near-field, thereby transforming the near-field.

6 Claims, 7 Drawing Sheets

LIGHT MODULATOR USING NEAR-FIELD

BACKGROUND OF THE INVENTION

1. Field of the Invention

The present invention relates, in general, to a spatial light modulator using a near-field and, more particularly, to a spatial light modulator using a near-field, in which the near-field formed between two media having different refractive indices and being in contact with each other is transformed to reflect and diffract incident light.

2. Description of the Prior Art

Generally, an optical signal processing technology has advantages in that a great amount of data is quickly processed in a parallel manner unlike a conventional digital information processing technology in which it is impossible to process a great amount of data in real time. Studies have been conducted on the design and production of a binary phase only filter, an optical logic gate, a light amplifier, an image processing technique, an optical device, and a light modulator using a spatial light modulation theory.

The spatial light modulator is applied to optical memory, optical display device, printer, optical interconnection, and hologram fields, and studies have been conducted to develop a display device employing it.

The spatial light modulator is embodied by a reflective deformable grating light modulator 10 as shown in FIG. 1. The light modulator 10 is disclosed in U.S. Pat. No. 5,311,360 by Bloom et al. The light modulator 10 includes a plurality of reflective deformable ribbons 18, which have reflective surface parts, are suspended above an upper part of a silicon substrate 16, and are spaced apart from each other at regular intervals. An insulating layer 11 is deposited on the silicon substrate 16. Subsequently, a sacrificial silicon dioxide film 12 and a low-stress silicon nitride film 14 are deposited.

The nitride film 14 is patterned by the ribbons 18, and a portion of the silicon dioxide film 12 is etched, thereby maintaining the ribbons 18 on the oxide spacer layer 12 by a nitride frame 20.

In order to modulate light having a single wavelength of $\lambda_o$, the modulator is designed so that thicknesses of the ribbon 18 and oxide spacer 12 are each $\lambda_o/4$.

Limited by a vertical distance (d) between a reflective surface 22 of each ribbon 18 and a reflective surface of the substrate 16, a grating amplitude of the modulator 10 is controlled by applying a voltage between the ribbon 18 (the reflective surface 22 of the ribbon 18 acting as a first electrode) and the substrate 16 (a conductive layer 24 formed on a lower side of the substrate 16 to act as a second electrode).

In an undeformed state of the light modulator with no voltage application, the grating amplitude is $\lambda_o/2$ while a total round-trip path difference between light beams reflected from the ribbon and substrate is $\lambda_o$. Thus, a phase of reflected light is reinforced.

Accordingly, in the undeformed state, the modulator 10 acts as a plane mirror when it reflects incident light. In FIG. 2, reference numeral 20 denotes the incident light reflected by the modulator 10 in the undeformed state.

When a proper voltage is applied between the ribbon 18 and substrate 16, the electrostatic force enables the ribbon 18 to move downward toward the surface of the substrate 16. At this time, the grating amplitude is changed to $\lambda_o/4$. The total round-trip path difference is a half of a wavelength, and light reflected from the deformed ribbon 18 and light reflected from the substrate 16 are subjected to destructive interference.

The modulator diffracts incident light 26 using the interference. In FIG. 3, reference numerals 28 and 30 denote light beams diffracted in +/−diffractive modes ($D_{+1}$, $D_{-1}$) in the deformed state, respectively.

However, the conventional light modulator is problematic in that the gaps that always exist between ribbons while the ribbons are not moved bring about a loss of light incident on the gaps between the ribbons.

Other problems of the conventional light modulator are that since the gaps must be minimized in order to minimize the light loss caused by the gaps between the ribbons, a structure is complicated, productivity is reduced, and precision is reduced.

Furthermore, the conventional light modulator is problematic in that diffraction always occurs due to the gaps between the ribbons even though the ribbons are not moved, resulting in poor contrast.

SUMMARY OF THE INVENTION

Therefore, the present invention has been made keeping in mind the above disadvantages occurring in the prior arts, and an object of the present invention is to provide a spatial light modulator using a near-field, in which the near-field formed between two media having different refractive indices and being in contact with each other is transformed to reflect and diffract incident light.

The above object can be accomplished by providing a light modulator using a near-field, including a light permeable substrate which has a predetermined first refractive index and allows incident light passing through a side thereof from an external light source to permeate therethrough. A near-field forming member has a second refractive index smaller than the first refractive index, and is formed on the other side of the light permeable substrate to achieve total reflection of the incident light to form the near-field. Actuating elements each have a third refractive index larger than the second refractive index, and are formed on the other side of the light permeable substrate to approach the near-field and deviate from the near-field, thereby transforming the near-field.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
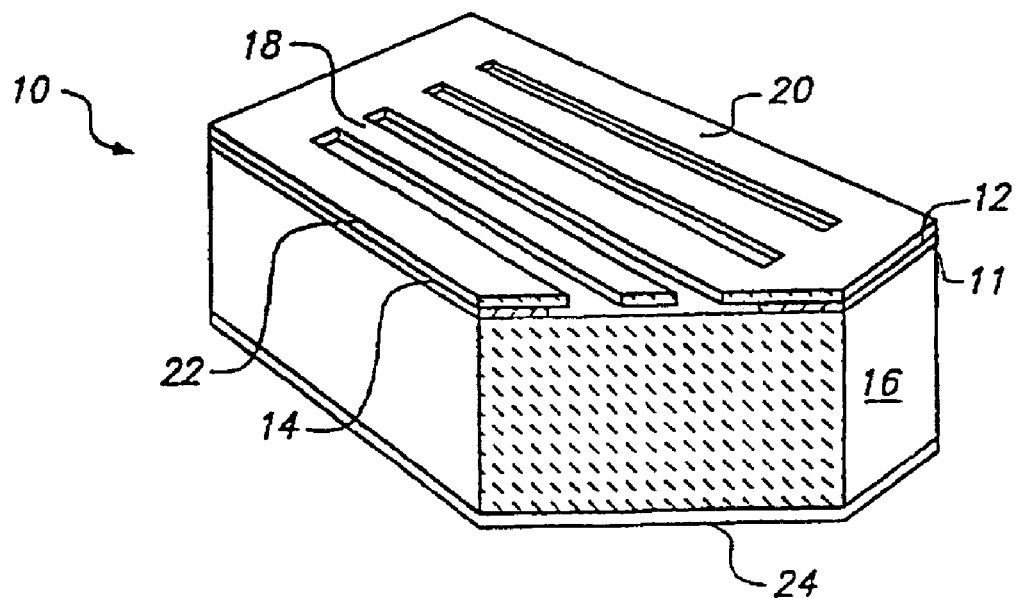
FIG. 1 illustrates a grating light modulator adopting an electrostatic manner according to a conventional technology.
Figure 2:
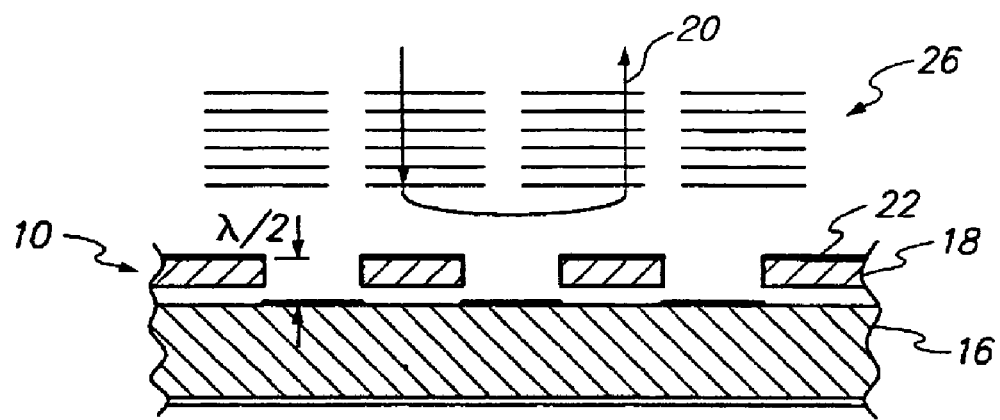
FIG. 2 illustrates reflection of incident light by the grating light modulator adopting the electrostatic manner according to the conventional technology in an undeformed state.
Figure 3:
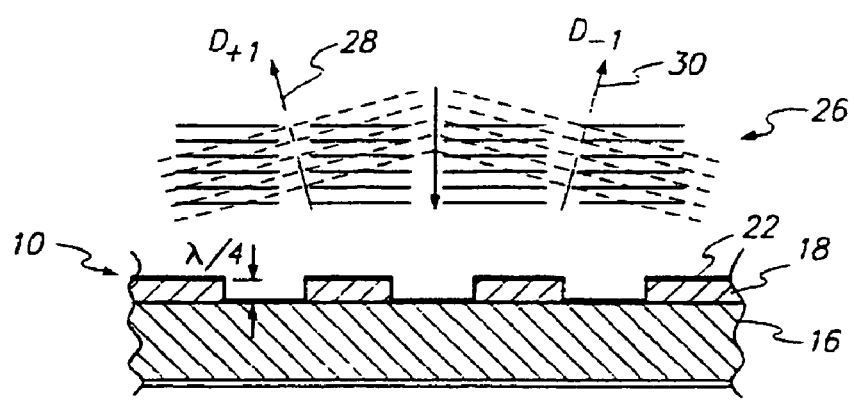
FIG. 3 illustrates diffraction of incident light by the grating light modulator according to the conventional technology in a deformed state caused by an electrostatic force.

Hereinafter, a detailed description will be given of the construction and operation of a light modulator using a near-field according to the present invention, referring to the drawings.

Figure 4:
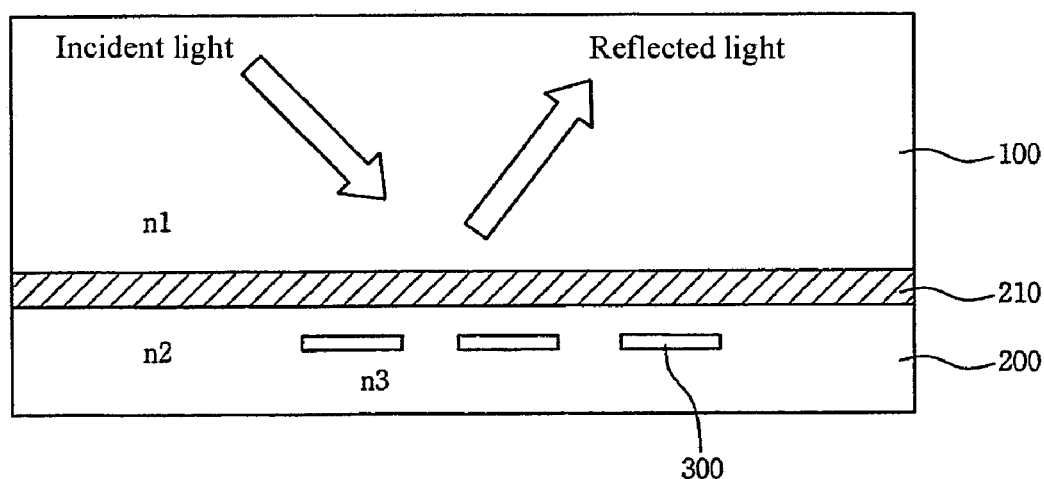
FIG. 4 is a sectional view of a light modulator according to the present invention, in which actuating elements are spaced from a near-field by a predetermined distance.
Figure 5:
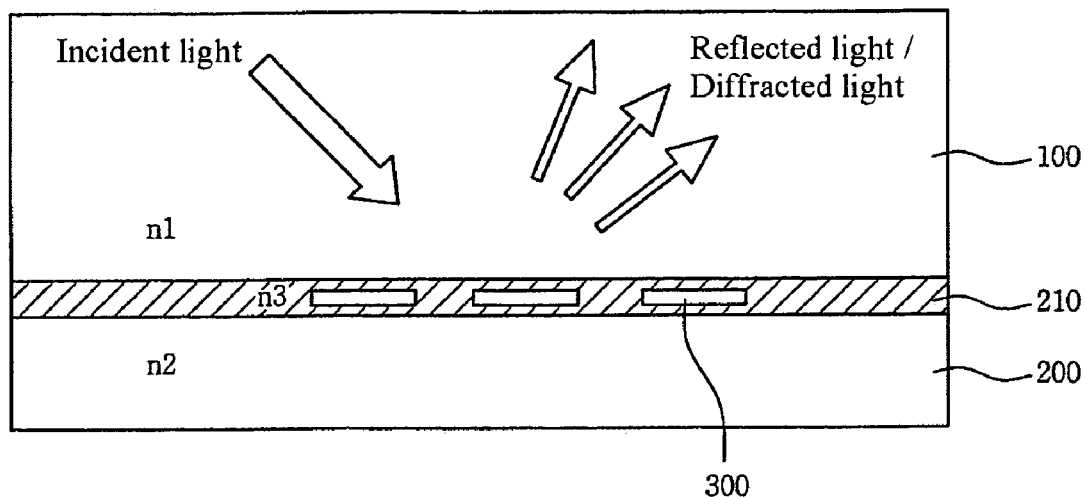
FIG. 5 is a sectional view of a light modulator according to the present invention, in which actuating elements are positioned in a near-field.

The light modulator using the near-field according to the present invention serves to transform the near-field formed by an internal total reflection of incident light occurring between two media having different refractive indices, thereby reflecting and diffracting incident light. As shown in FIGS. 4 and 5, it includes a light permeable substrate 100, a near-field forming member 200, and actuating elements 300.

Figure 6:
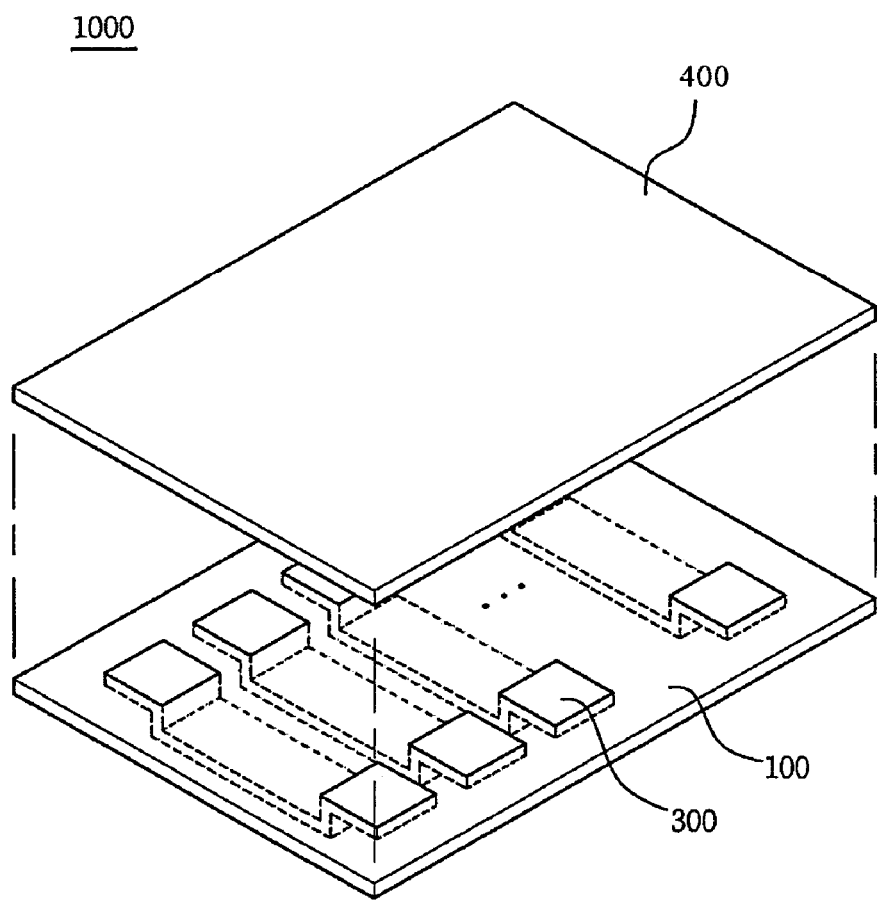
FIG. 6 illustrates an upper side of a light permeable substrate according to the present invention, to which a light transmitting unit is attached.

At this time, as shown in FIG. 6, the light modulator using the near-field according to the present invention may further include a prism acting as a light transmitting unit 400 which controls an incident angle of incident light on one side of the light permeable substrate 100 to be a critical angle or more, thereby causing the incident light to be incident on the near-field forming member 200.

In this regard, FIG. 4 is a sectional view of the light modulator according to the present invention, in which the actuating elements are spaced from the near-field by a predetermined distance, and FIG. 5 is a sectional view of the light modulator according to the present invention, in which the actuating elements are positioned in the near-field.

As shown in FIGS. 4 and 5, the light permeable substrate 100 functions to enable light passing through a side thereof to be incident on the near-field forming member 200 having a predetermined second refractive index ($n_2$) and attached to the other side thereof. The light permeable substrate 100 is made of a light permeable medium, such as glass or quartz, having a predetermined first refractive index ($n_1$).

In this respect, the first refractive index ($n_1$) of the light permeable substrate 100 is larger than the second refractive index ($n_2$) of the near-field forming member 200, and thus, light passing through the side of the light permeable substrate 100 is incident on the near-field forming member 200 due to the difference between refractive indices, thereby achieving the internal total reflection in the near-field forming member 200.

At this time, the near-field forming member 200 includes a near-field forming medium, such as air, having the second refractive index ($n_2$) smaller than the first refractive index ($n_1$), and functions to generate the near-field 210 affecting reflection and diffraction of incident light at an interface between the light permeable substrate 100 and itself by the internal total reflection of the incident light.

Additionally, a plurality of actuating elements 300, which each include a medium having a third refractive index ($n_3$) and is capable of being electrically moved by a predetermined MEMS process, is formed on the other side of the light permeable substrate 100 as shown in FIGS. 7 to 9.

At this time, the actuating elements 300 are each made of a member having the third refractive index ($n_3$) larger than the second refractive index ($n_2$) of the near-field forming member 200, and moved close to or away from the near-field 210 formed in the near-field forming member 200 by a predetermined distance by an actuating voltage, thereby functioning to transform the near-field 210.

Hereinafter, a detailed description will be given of structures of the actuating elements formed on the other side of the light permeable substrate, referring to FIGS. 7 to 9.

Figure 7A:
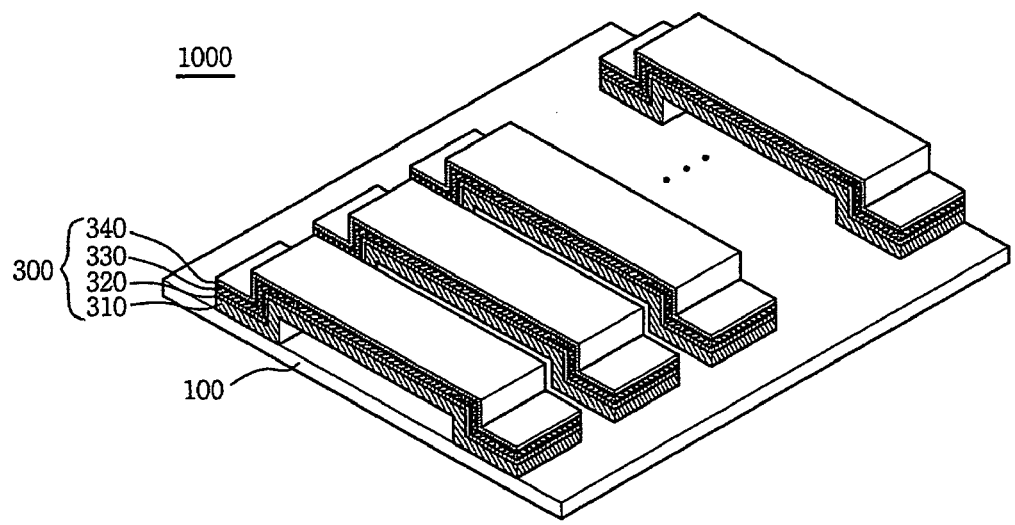
FIGS. 7a and 7b illustrate lower sides of light permeable substrates according to an embodiment of the present invention, to which actuating elements are attached.

As shown in FIG. 7a, each actuating element 300 having a third refractive index ($n_3$) according to the present invention is attached to a light permeable substrate 100 at both ends thereof while a lower supporter 310 is raised.

At this time, the lower supporter 310 not only provides an air space so that a near-field forming member 200, which has a second refractive index ($n_2$) and on which a near-field 210 is formed, is attached to the other side of the light permeable substrate 100, but also enables the actuating element 300 to move vertically.

In this regard, the lower supporter 310 is made of a reflective member capable of reflecting light passing through the light permeable substrate 100, such as $SiO_2$, $Si_3N_4$, Si, $ZrO_2$, and $Al_2O_3$.

A lower electrode 320 is laminated on a whole area of a side of the lower supporter 310 to receive an actuating voltage applied from an external power source.

At this time, the lower electrode 320, which serves to receive a predetermined actuating voltage from the external power source and to transport the actuating voltage to a piezoelectric layer 330 (which is described later), is formed on a side of the lower supporter 310 using an electrode material, such as Pt, Ta/Pt, Ni, Au, Al, and $RuO_2$, through a sputtering or deposition process.

Furthermore, an external electrode, or in detail, the piezoelectric layer 330, is formed on the lower electrode 320, which is shrunken and expanded by the actuating voltage applied through the lower electrode 320 and an upper electrode 340 (which is described later) so as to be vertically moved.

At this time, the piezoelectric layer 330 is made of a predetermined piezoelectric member, such as PzT, PNN-PT, ZnO, Pb, Zr, or titanium, capable of being vertically or horizontally transformed in length by a piezoelectric action caused by the applied actuating voltage. In this regard, the piezoelectric layer 330 is formed in a thickness of 0.01–20.0 μm on the lower electrode 320 using the piezoelectric member according to a wet process (screen printing, sol-gel coating or the like) or a dry process (sputtering, evaporation, vapor deposition or the like).

As well, the upper electrode 340 is formed on the piezoelectric layer 330 to provide the actuating voltage applied from the external power source to the piezoelectric layer 330 in conjunction with the lower electrode 320.

At this time, the upper electrode 340, which serves to receive the actuating voltage from the external power source and to apply the actuating voltage to the piezoelectric layer 330 in conjunction with the lower electrode 320, is formed on the piezoelectric layer 330 using an electrode material, such as Pt, Ta/Pt, Ni, Au, Al, and $RuO_2$, through a sputtering or deposition process.

Figure 7B:
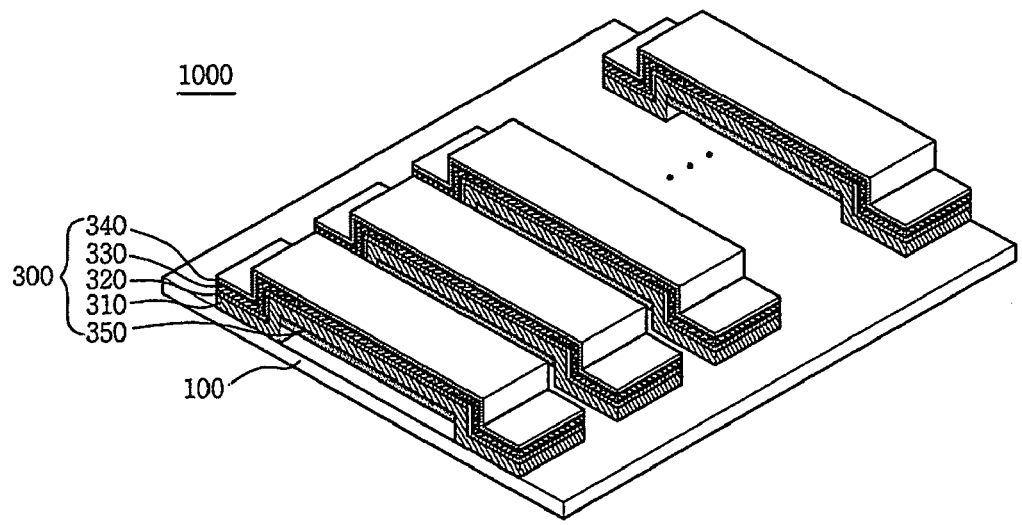

Furthermore, as shown in FIG. 7b, a micromirror layer 350 made of a predetermined light reflective material, such as Al, Au, Ag, Pt, and Au/Cr, may be further formed on the other side of the lower supporter 310 which directly faces the light permeable substrate 100 so as to increase reflection and diffraction of incident light from externals.

In this respect, it should be noted that the micromirror layer 350 may be formed on a whole area or a portion of the other side of the lower supporter 310.

Figure 8A:
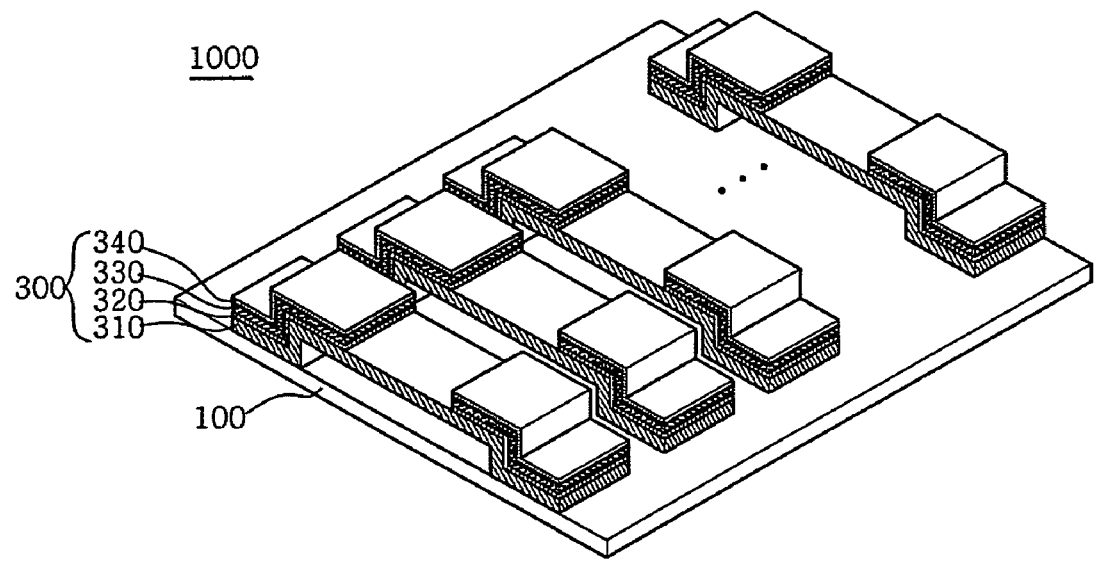
FIGS. 8a and 8b illustrate lower sides of light permeable substrates according to another embodiment of the present invention, to which actuating elements are attached.

As shown in FIG. 8a, an actuating element 300 formed on the other side of a light permeable substrate 100 according to the present invention is attached to the light permeable substrate 100 at both sides thereof while a lower supporter 310 is raised. Accordingly, the lower supporter 310 not only provides an air space so that a near-field forming member 200, which has a second refractive index and on which a near-field 210 is formed, is attached to the other side of the light permeable substrate 100, but also enables the actuating element 300 to move vertically.

At this time, the lower supporter 310 is made of a reflective member capable of reflecting light passing through the light permeable substrate 100, in detail, a metal reflective member.

A lower electrode 320 is laminated on at both ends of the lower supporter 310 to receive an actuating voltage applied from an external power source, and a piezoelectric layer 330 is formed on the lower electrode 320, which is shrunken and expanded by the actuating voltage applied from externals so as to move vertically. As well, an upper electrode 340 is formed on the piezoelectric layer 330 to provide the actuating voltage applied from the external power source to the piezoelectric layer 330 in conjunction with the lower electrode 320.

Figure 8B:
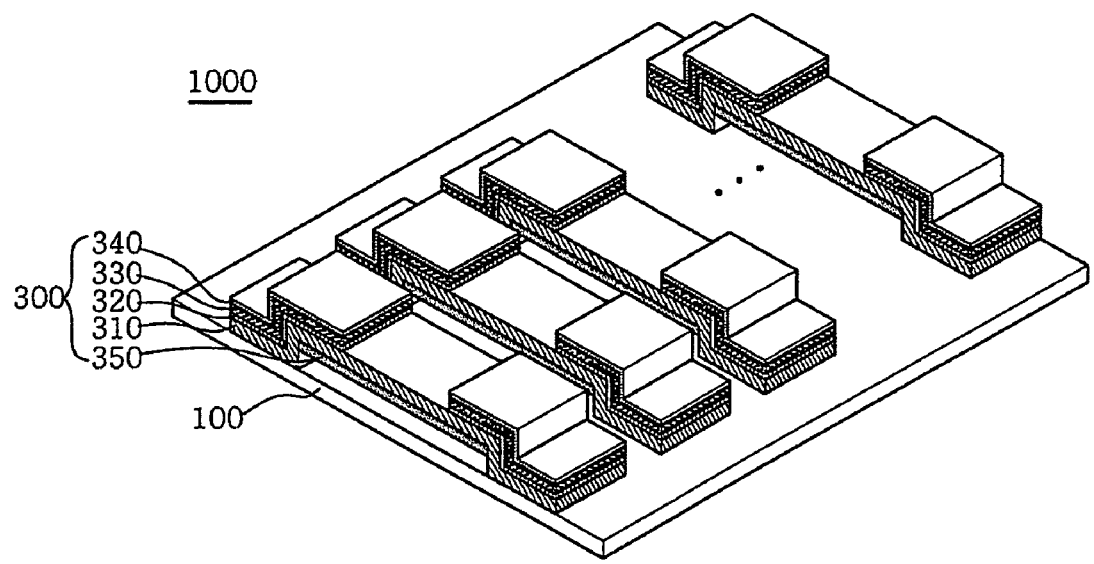

Furthermore, as shown in FIG. 8b, a micromirror layer 350 may be further formed on the other side of the lower supporter 310 which directly faces the light permeable substrate 100 so as to increase reflexibility of light incident.

In this respect, it should be noted that the micromirror layer 350 may be formed on a whole area or a portion of the other side of the lower supporter 310.

Figure 9A:
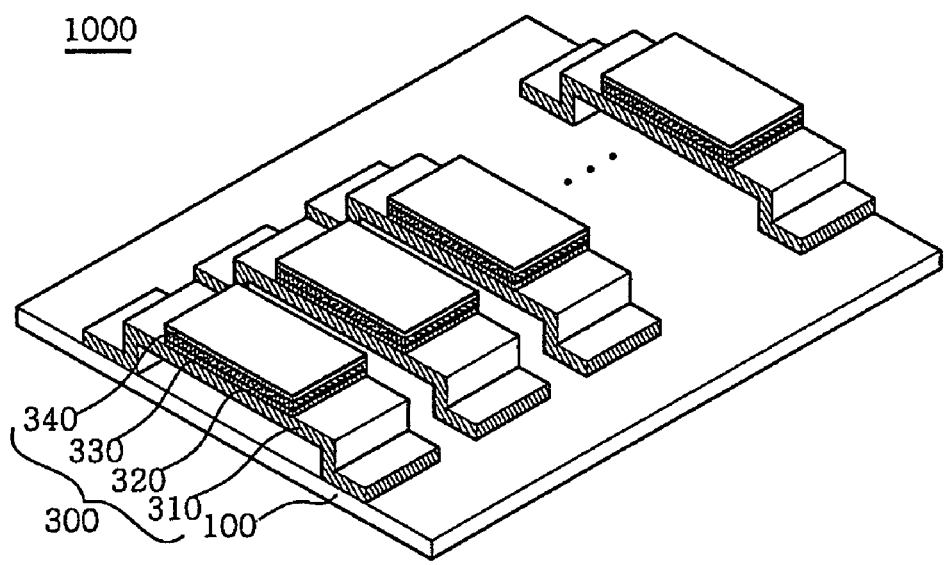
FIGS. 9a and 9b illustrate lower sides of light permeable substrates according to still another embodiment of the present invention, to which actuating elements are attached.

As shown in FIG. 9a, an actuating element 300 formed on the other side of a light permeable substrate 100 using a medium having a second refractive index according to the present invention is attached to the light permeable substrate 100 at both sides thereof while a lower supporter 310 is raised. Accordingly, the lower supporter 310 not only provides an air space so that a near-field forming member 200 which has the second refractive index ($n_2$) and on which a near-field 210 is formed is attached to the other side of the light permeable substrate 100, but also enables the actuating element 300 to move vertically.

At this time, the lower supporter 310 is made of a reflective member capable of reflecting light passing through the light permeable substrate 100, in detail, a metal reflective member.

A lower electrode 320 is laminated on at the center portion of the lower supporter 310 to receive an actuating voltage applied from an external power source, and a piezoelectric layer 330 is formed on the lower electrode 320, which is shrunken and expanded by the actuating voltage applied from externals so as to move vertically. As well, an upper electrode 340 is formed on the piezoelectric layer 330 to provide the actuating voltage applied from the external power source to the piezoelectric layer 330 in conjunction with the lower electrode 320.

Figure 9B:
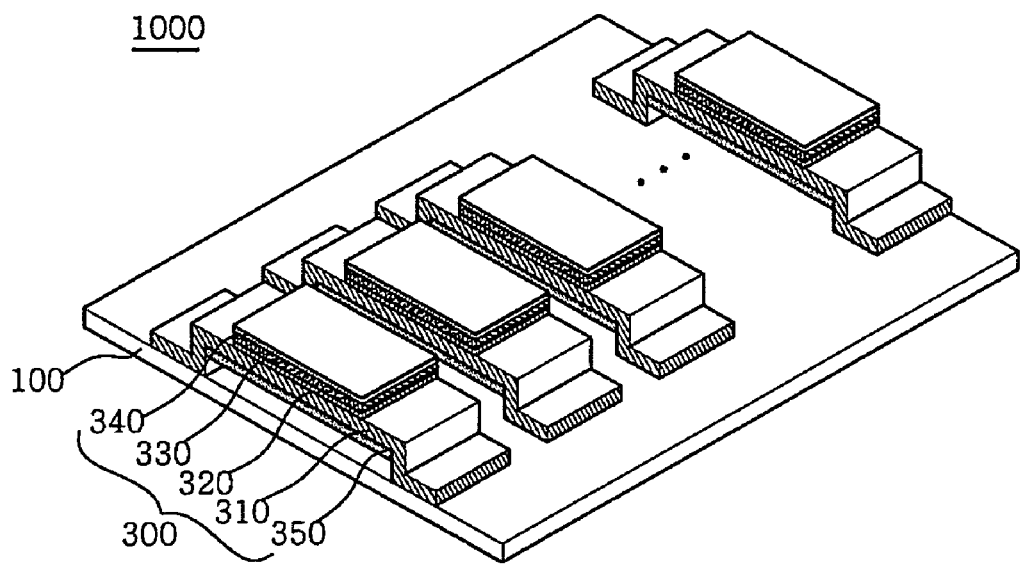

Furthermore, as shown in FIG. 9b, a micromirror layer 350 may be further formed on the other side of the lower supporter 310 which directly faces the light permeable substrate 100 so as to increase the reflexibility of light incident.

In this respect, it should be noted that the micromirror layer 350 may be formed on a whole area or a portion of the other side of the lower supporter 310.

Hereinafter, a detailed description will be given of the operation of the light modulator using the near-field, referring to FIGS. 4 and 5.

As shown in FIG. 4, when no actuating voltage is applied to lower and upper electrodes 320, 340 constituting each actuating element 300 from an external power source, the actuating element 300 is spaced by a predetermined distance from the near-field 210 formed in a near-field forming member 200 having a second refractive index ($n_2$).

At this time, the actuating element 300 does not affect the near-field 210, satisfying an internal total reflection condition of incident light. Therefore, a light permeable substrate 100 acts as a reflector conducting only the internal total reflection of incident light.

However, when the actuating voltage is applied to the lower and upper electrodes 320, 340 constituting the actuating element 300 from the external power source, the actuating element 300 is moved so that it is positioned close to or in the near-field formed in the near-field forming member 200 having the second refractive index ($n_2$) as shown in FIG. 5.

Figure 10:
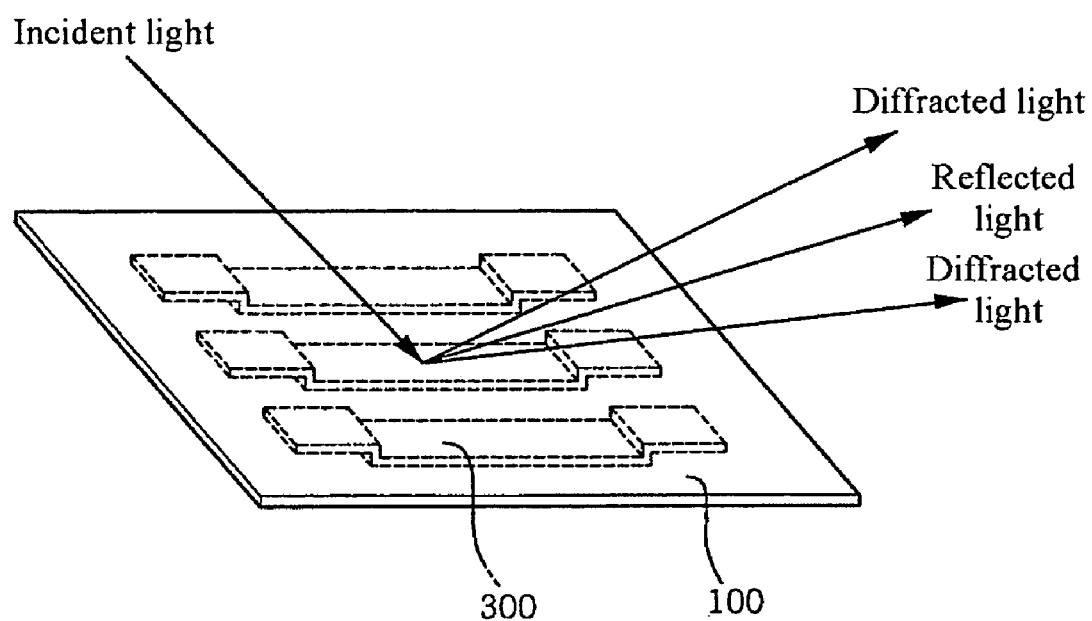
FIG. 10 illustrates reflection and diffraction of incident light by a side of a light permeable substrate constituting a light modulator according to the present invention.

At this time, the actuating element 300 affects the near-field 210 to disturb the internal total reflection of incident light, and thus, the light permeable substrate 100 acts as a diffractor reflecting and diffracting incident light as shown in FIG. 10, thereby forming reflected light and diffracted light having a predetermined diffraction coefficient, for example a diffraction coefficient of 0 or 1 degrees.

In this regard, intensities of the reflected light and diffracted light are changed depending on the degree of approach of the actuating element to the near-field. A closer approach of the actuating element to the near-field brings about an increase in the intensity change of the reflected light and diffracted light.

As described above, the present invention is advantageous in that a near field formed by two media having different refractive indices is transformed to reflect, attenuate, and diffract incident light, preventing formation of gaps between actuating elements constituting a conventional light modulator, thereby reducing light loss caused by the gaps.

Another advantage of the present invention is that it is not necessary to conduct a complicated procedure for reducing the gaps to attenuate the light loss caused by the gaps between the actuating elements, resulting in easy production, thereby improving productivity.

Furthermore, the present invention is advantageous in that when the actuating elements do not approach the near-field, diffraction caused by the gaps between the actuating elements constituting the conventional light modulator does not occur, thereby providing excellent contrast when incident light is diffracted.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A light modulator using a near-field, comprising:
   a light permeable substrate which has a predetermined first refractive index and allows incident light passing through a side thereof from an external light source to permeate therethrough;
   a near-field forming member which has a second refractive index smaller than the first refractive index and is formed on the other side of the light permeable substrate to achieve total reflection of the incident light and thus to form the near-field; and
   actuating elements which each have a third refractive index larger than the second refractive index and are formed on the other side of the light permeable substrate to be moved close to or away from the near-field, thereby transforming the near-field.

2. The light modulator as set forth in claim 1, further comprising a light transmitting unit for controlling an incident angle of the incident light to be a critical angle or more to allow the light to be incident on the near-field forming member.

3. The light modulator as set forth in claim 2, wherein the light transmitting unit is a prism.

4. The light modulator as set forth in claim 1, wherein the near-field forming member includes air.

5. The light modulator as set forth in claim 1, wherein when the actuating elements are spaced from the near-field by a predetermined distance, the light permeable substrate totally reflects the incident light.

6. The light modulator as set forth in claim 1, wherein when the actuating elements are moved close to the near-field or positioned in the near-field to transform the near-field, the light permeable substrate diffracts the incident light to form reflected light and diffracted light.

* * * * *